(12) United States Patent
Gencel

(10) Patent No.: US 10,272,777 B2
(45) Date of Patent: Apr. 30, 2019

(54) MANUAL-SHIFT MOTOR VEHICLE TRANSMISSION CLUTCH ACTUATOR WITH A DAMPER

(71) Applicant: Ford Otomotiv Sanayi Anonim Sirketi, Sancaktepe, Istanbul (TR)

(72) Inventor: Sulhi Gencel, Kocaeli (TR)

(73) Assignee: FORD OTOMOTIV SANAYI ANONIM SIRKETI, Istanbul (TR)

( * ) Notice: Subject to any disclaimer, the term of this patent is extended or adjusted under 35 U.S.C. 154(b) by 235 days.

(21) Appl. No.: 15/223,473

(22) Filed: Jul. 29, 2016

(65) Prior Publication Data

US 2017/0028847 A1     Feb. 2, 2017

(30) Foreign Application Priority Data

Jul. 31, 2015    (EP) .................................. 15179225

(51) Int. Cl.
    *B60K 23/02*       (2006.01)
    *F16F 6/00*        (2006.01)
                       (Continued)

(52) U.S. Cl.
    CPC .............. *B60K 23/02* (2013.01); *F16D 48/10* (2013.01); *F16F 6/00* (2013.01); *F16F 9/14* (2013.01);
                       (Continued)

(58) Field of Classification Search
    CPC .. G05G 5/05; G05G 5/03; G05G 1/44; G05G 1/46; G05G 1/38; G05G 1/30; B60K 26/021; B60K 2026/023; B60K 23/02;
B60T 7/04; F16D 2500/1082; F16D 2500/1083; F16D 2500/3021; F16D 2500/31413; F16D 2500/3165; F16D 2500/70668
See application file for complete search history.

(56) References Cited

U.S. PATENT DOCUMENTS 4,621,721 A * 11/1986 Czerwick ................ F16D 25/14
                                                      192/109 F
9,441,701 B2     9/2016 Cichon, Jr.
                       (Continued)

FOREIGN PATENT DOCUMENTS

CN        1265986       2/2000
DE        29912963     10/1999
          (Continued)

OTHER PUBLICATIONS

EPO Translation of FR 29505154 A1, Delforian, Feb. 29, 2008. (Year: 2018).*

*Primary Examiner* — Daniel D Yabut
(74) *Attorney, Agent, or Firm* — Diederiks & Whitelaw, PLC

(57) ABSTRACT

A clutch actuator for a manual-shift motor vehicle transmission, includes a driver-operated clutch pedal or lever, a clutch linkage between a clutch of the motor vehicle and the pedal or lever, and a damper adapted to delay clutch engagement on a fast release of the clutch pedal or lever. The damper is effective to delay clutch engagement only within a limited range of a whole clutch engagement movement and is substantially ineffective outside the limited range and within the whole range of a clutch disengagement movement.

18 Claims, 4 Drawing Sheets

(51) Int. Cl.
    *F16F 9/14*          (2006.01)
    *F16D 48/10*        (2006.01)
    *G05G 1/30*         (2008.04)

(52) U.S. Cl.
    CPC ....... *G05G 1/30* (2013.01); *F16D 2500/1082* (2013.01); *F16D 2500/1083* (2013.01); *F16D 2500/3021* (2013.01); *F16D 2500/3165* (2013.01); *F16D 2500/31413* (2013.01); *F16D 2500/70668* (2013.01)

(56) References Cited

U.S. PATENT DOCUMENTS

| | | | |
|---|---|---|---|
| 9,829,907 B2* | 11/2017 | Kim | G05G 1/44 |
| 2010/0307856 A1* | 12/2010 | Hahn | B60K 23/02 |
| | | | 180/333 |
| 2012/0152053 A1* | 6/2012 | Kondo | F16F 9/145 |
| | | | 74/513 |
| 2014/0015180 A1* | 1/2014 | Pepka | F16F 6/005 |
| | | | 267/195 |
| 2014/0110217 A1* | 4/2014 | Cichon, Jr. | F16F 9/535 |
| | | | 192/99 R |
| 2016/0004271 A1* | 1/2016 | Gregory | G05G 1/30 |
| | | | 701/22 |

FOREIGN PATENT DOCUMENTS

| | | |
|---|---|---|
| DE | 102007018962 | 10/2008 |
| FR | 2905154 | 2/2008 |
| JP | S5275731 | 6/1977 |

\* cited by examiner

MANUAL-SHIFT MOTOR VEHICLE TRANSMISSION CLUTCH ACTUATOR WITH A DAMPER

CROSS-REFERENCE TO RELATED APPLICATIONS

This application claims benefit and priority to European Patent Application No. 15179225.6 filed Jul. 31, 2015. The entire content of this application is incorporated herein by reference.

BACKGROUND OF THE INVENTION

The invention relates to a clutch actuator for a manual-shift motor vehicle transmission, comprising a driver-operated clutch pedal or lever, a clutch linkage between a clutch of the motor vehicle and the pedal or lever, and a damper adapted to delay clutch engagement on a fast release of the clutch pedal or lever.

A clutch actuator is disclosed in US 2014/0110217 A1, incorporated herein by reference. The damper, which is coupled permanently either with the pedal or lever or with a part of the clutch linkage, delays excessively rapid engagement of the clutch by providing a force opposed to pressure from a return spring of the clutch pedal or lever. The damper functions to prevent damage to the motor vehicle and to avoid discomfort to passengers. During a clutch engagement movement, the damper is more effective than during a clutch disengagement movement, and the damper may be effective only during starting from a standing position of the vehicle. If the damper is effective, it delays clutch engagement within the whole range of a clutch engagement movement. If the damper would be effective irrespective of the driving situation, it would prevent fast clutch reengagement also during shifting between any gears, which could be uncomfortable for the driver. Further, if the damper would be effective only during starting from a standing position of the vehicle, there would be a non-uniform reengagement behavior of the clutch depending on the driving situation which could confuse the driver.

The object of this invention is to provide a more comfortable clutch actuator with a damper. This object is solved by a clutch actuator according the preferred embodiment of the invention.

SUMMARY OF THE INVENTION

According to the invention, the damper is effective to delay clutch engagement only within a limited range of a clutch engagement movement rather than to dampen constantly within the whole range of a clutch engagement movement as in the above-mentioned state of the art. This limited range can be adapted to a range of engagement states of the clutch wherein the clutch is engaged only partially, that is, a range with a certain amount of slip between the clutch disks. The limited range may include or correspond to such a slipping range of the clutch.

A damper according to the invention is substantially or totally ineffective outside the limited range of a clutch engagement movement as well as within the whole range of a clutch disengagement movement. Therefore, the effect of the damper on driver's comfort is so small that it would not be necessary to distinguish between different driving situations as proposed in the above mentioned state of the art.

In other words, a damper according to the invention has a nonlinear dampening characteristic; and such a damper can be realized in two alternative ways.

In a first alternative, the damper is a hydraulic one having an actuating surface which is tending and being able to contact an abutment surface of the clutch pedal or lever or of the clutch linkage while the clutch is engaged partially or completely, and which actuating surface is separated from the abutment surface by a clearance while the clutch is disengaged. The abutment surface can be located at the clutch pedal or lever or at any appropriate mechanical part of the clutch linkage, which may comprise mechanics and/or hydraulics.

In case of a damper of the linear type, wherein a cylinder houses a piston, a piston rod, and a return spring for the piston and piston rod, said actuating surface would be a free end of the piston rod, and said clearance would be a gap between said actuating surface and said abutment surface.

In case of a damper of the rotary type, which may be coupled directly or via a gear to any rotation point of the pedal or lever or of a clutch linkage, said clearance would be a rotary clearance between two rotating elements having any actuating and abutment surfaces.

The separated actuating and abutment surfaces provide for a mechanical decoupling of the damper and the clutch pedal or lever. Because of this mechanical decoupling and because of the absent dampening effect in the disengagement direction, the driver does not feel any excessive force onto the clutch pedal or lever during disengagement of the clutch by pressing a pedal or lever. It would not be necessary, however possible, to reduce the dampening effect in the direction of any phase of disengagement within the damper itself, as in the above mentioned state of the art, in order to make the damper ineffective during clutch disengagement.

During engagement of the clutch by releasing the pedal or lever, the pedal is delayed only within a limited range of a movement, and the driver feels practically only the force of a relatively strong return spring of the clutch pedal or lever. Nevertheless, clutch engagement on a fast release of the clutch pedal or lever is delayed during the important slipping phase of the clutch. This will ensure smooth transitions for the clutch to engage with vehicle motor while not affecting driver's comfort.

In a second alternative, the damper is an electromagnetic damper which is dampening by Lorentz forces instead by varying the viscosity of a Magneto Rheological hydraulic fluid by means of a magnetic field as proposed in the above mentioned state of the art. Such an electromagnetic damper can be easily designed in a manner that the damper delays clutch engagement only within a limited range of a whole clutch engagement movement.

The electromagnetic damper may be of the linear type having a coil and a permanent magnet which induces a current within the coil if moved into or out of the coils, which current produces a Lorentz force between the coil and the permanent magnet which is proportional to the relative velocity between the coil and the permanent magnet and which is used for dampening.

A person skilled in the art knows how to implement alternatively an electromagnetic damper of the rotary type.

As for both types, there are a lot of possibilities to achieve a desired nonlinear dampening characteristic, for example by an appropriate spatial arrangement of the permanent magnet and/or the windings of the coil, providing a series of coils, and/or the layout of an external circuitry of the coil or coils.

It is possible to implement the first and second alternatives in one and the same damper.

In a preferred embodiment, the clutch actuator includes a servomotor and a mechanism such as a shaft for positioning of the damper in order to shift the limited range of delay. In case of an electromagnetic damper, the dampening characteristic may be varied alternatively or additionally by switching the external circuitry of the coils.

Any means for positioning of the damper would enable an electronic vehicle system like a powertrain control module to adjust the damper to work within an intended range, which would be tested and calculated to ensure maximum driver's comfort.

BRIEF DESCRIPTION OF THE DRAWINGS

In the following an embodiment of the invention is described in detail with reference to the drawings, in which.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale; and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
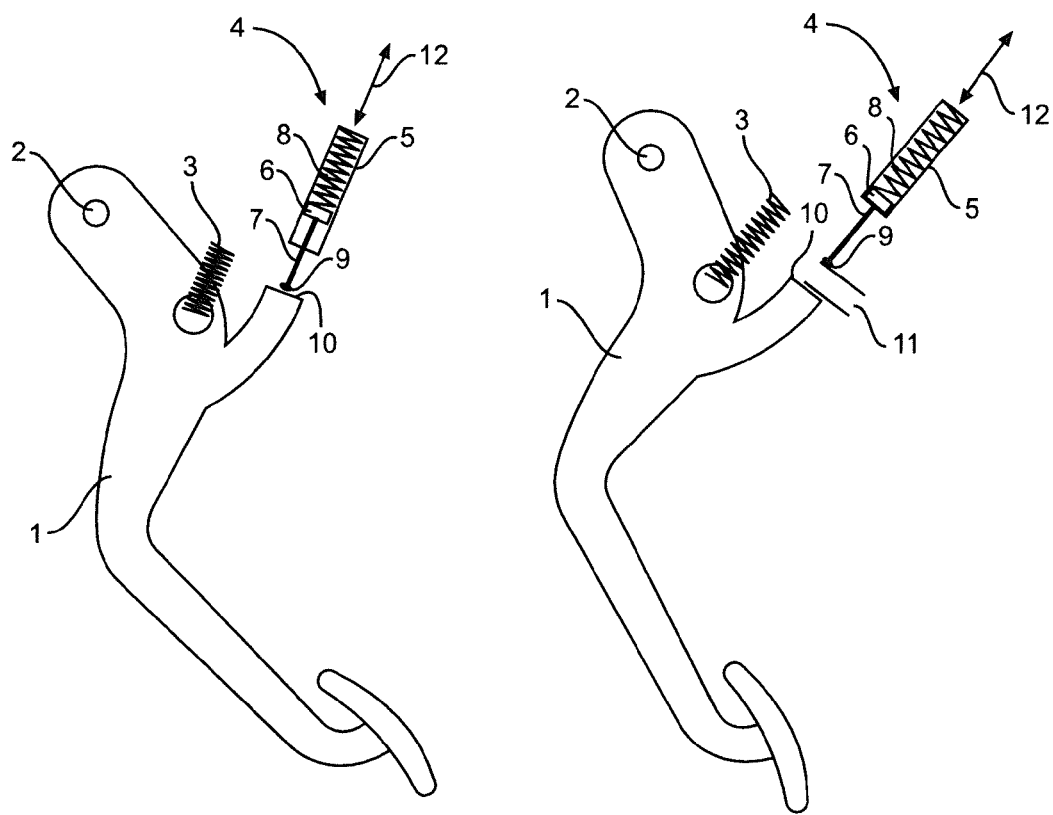
FIG. 1 shows a clutch pedal comprising a damper.

FIG. 1 shows a driver-operated clutch pedal 1 which is pivoted at 2 and biased by a return spring 3 into the position shown on the left in FIG. 1, which position corresponds to an engaged state of a clutch of a manual-shift motor vehicle transmission. The clutch is disengaged by stepping on the pedal 1. On the right in FIG. 1, the clutch pedal 1 is shown in a depressed state.

The clutch pedal 1 may be coupled via any mechanical and/or hydraulic linkage to a throw out lever which is located proximately to the clutch and which is acting on a pressure plate of the clutch.

In FIG. 1 a damper 4 is arranged and adapted to delay clutch engagement on a fast release of the clutch pedal 1. The damper 4 comprises a cylinder 5, a piston 6, a piston rod 7 and a relatively weak return spring 8 for the piston 6 and the piston rod 7.

The piston rod 7 has a free end 9 having an actuating surface which abuts against an abutment surface 10 of the clutch pedal 1, when the clutch pedal 1 is not or only partly depressed, as shown on the left in FIG. 1. When the clutch pedal 1 is more depressed, as shown on the right in FIG. 1, there arises a clearance or gap 11 between the actuating surface of the free end 9 of the piston rod 7 and the abutment surface 10 of the clutch pedal 1. The width of the gap 11 may be approximately half of the maximum length of stroke of the abutment surface 10 between both end positions of the clutch pedal 1 or may be somewhat smaller.

This damper 4 is effective to delay clutch engagement only within a limited range of a whole clutch engagement movement and being substantially ineffective outside the limited range as well as within the whole range of a clutch disengagement movement.

There may be a servo motor and a mechanism such as a shaft for positioning of the damper 4 in its longitudinal direction, which is the direction of the double-ended arrow 12 in FIG. 1, in order to be able to shift the effective range of delay of a clutch disengagement movement.

Figure 2:
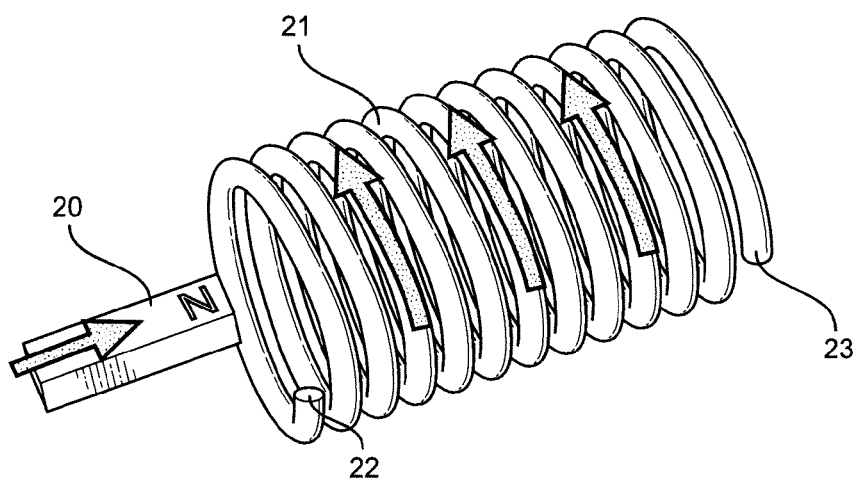
FIG. 2 illustrates the working principle of an electromagnetic damper.

The hydraulic damper 4 of FIG. 1 can be replaced by an electromagnetic damper which is dampens by Lorentz forces. The working principle of such an electromagnetic damper is shown in FIG. 2. When a permanent magnet 20 is moved into a coil 21, as indicated by a straight arrow in FIG. 2, it induces a voltage in the coil and, if the ends 22, 23 of the coil 21 are connected with each other either directly or by a resistance, a current is induced, which is indicated by curved arrows in FIG. 2.

Such a current produces a Lorentz force between the coil 21 and the permanent magnet 20 which is opposite to the direction of movement of the permanent magnet 20 and which is proportional to the relative velocity between the coil 21 and the permanent magnet 20 and which is used for dampening by conversion of kinetic energy into thermal energy which is produced within an external resistance and/or within the inherent resistance of the coil 21.

An electromagnetic damper of the type as shown in FIG. 2 can be easily designed in a manner that the damper delays clutch engagement only within a limited range of a whole clutch engagement movement which corresponds, for example, substantially to a slipping range of the clutch.

In a corresponding implementation of a clutch actuator with an electromagnetic damper, the permanent magnet 20 could be a part of a piston rod 7 as in FIG. 1, and the coil could be arranged in the region of the return spring 8 in FIG. 1.

Having an electromagnetic damper of the type as shown in FIG. 2, it would be possible but not necessary to provide a free end 11 of the piston rod 9 as in FIG. 1. Instead of this, a member corresponding to the piston rod and bearing the permanent magnet could be connected permanently to the clutch pedal, if an external circuitry of the coil is designed in a manner that any movement of the permanent magnet 20 out of the coil 21 would not be damped. This could be realized, for example, by a diode within the external circuitry which is connected to the ends 22, 23 of the coil 21. The diode would allow a current flow only in one direction. Without a current flow in the coil 21, no Lorentz force would be induced.

It is possible that an electromagnetic damper can be implemented more easily in the form of a rotary type, which may be coupled to any rotation point of a clutch pedal or lever or of a clutch linkage. An electromagnetic damper of the rotary type would comprise a first member containing at least one magnet, and a second member containing at least one coil, wherein a relative rotation of the first member and the second member generates an electromagnetic force in the coil or coils which force acts as a damping force to the relative rotation.

Figure 3:
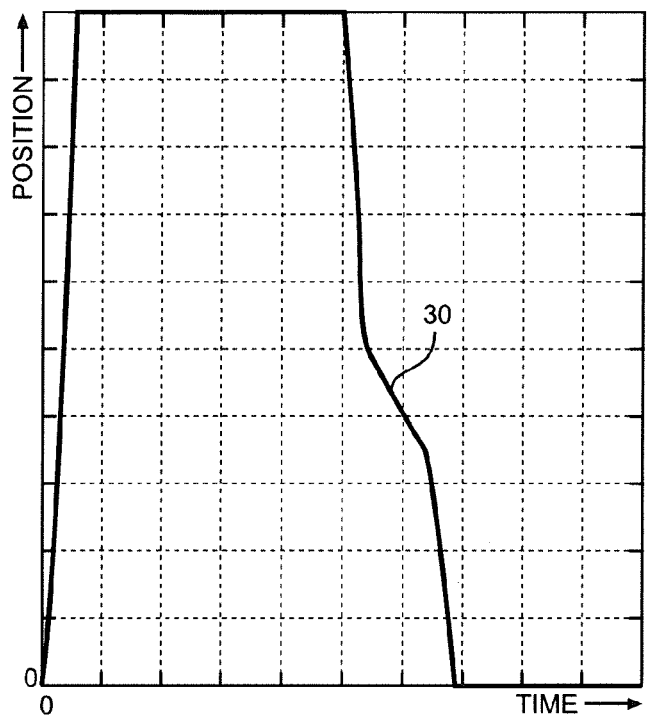
FIG. 3 is a graph showing engagement positions of a member of a clutch with a damped actuator in the course of a typical operation of disengagement and subsequent engagement of the clutch.

FIG. 3 is a graph showing by a thick curve the positions of a throw out lever or of a pressure plate of the clutch during a typical operation of disengagement and subsequent engagement of the clutch, when a damper having nonlinear dampening characteristic is provided. The horizontal axis is the time in arbitrary units, for example over a few seconds, and the vertical axis is the position in arbitrary units. The dampening phase 30 of the damper appears in a less steep part of the engagement part of the curve.

Figure 4:
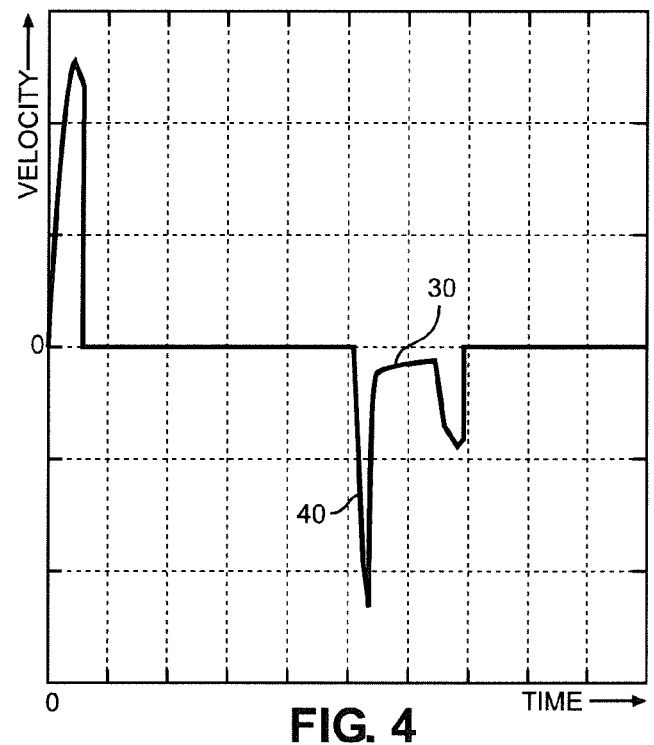
FIG. 4 is a graph showing engagement velocities corresponding to the positions of FIG. 3.

FIG. 4 is a graph showing by a thick curve the velocities of a throw out lever or pressure plate of the clutch during an operation of disengagement and subsequent engagement of the clutch as in FIG. 3. The horizontal axis is the time, and the vertical axis is the velocity. There is seen a strong deceleration 40 at the beginning of the dampening phase 30.

Figure 5:
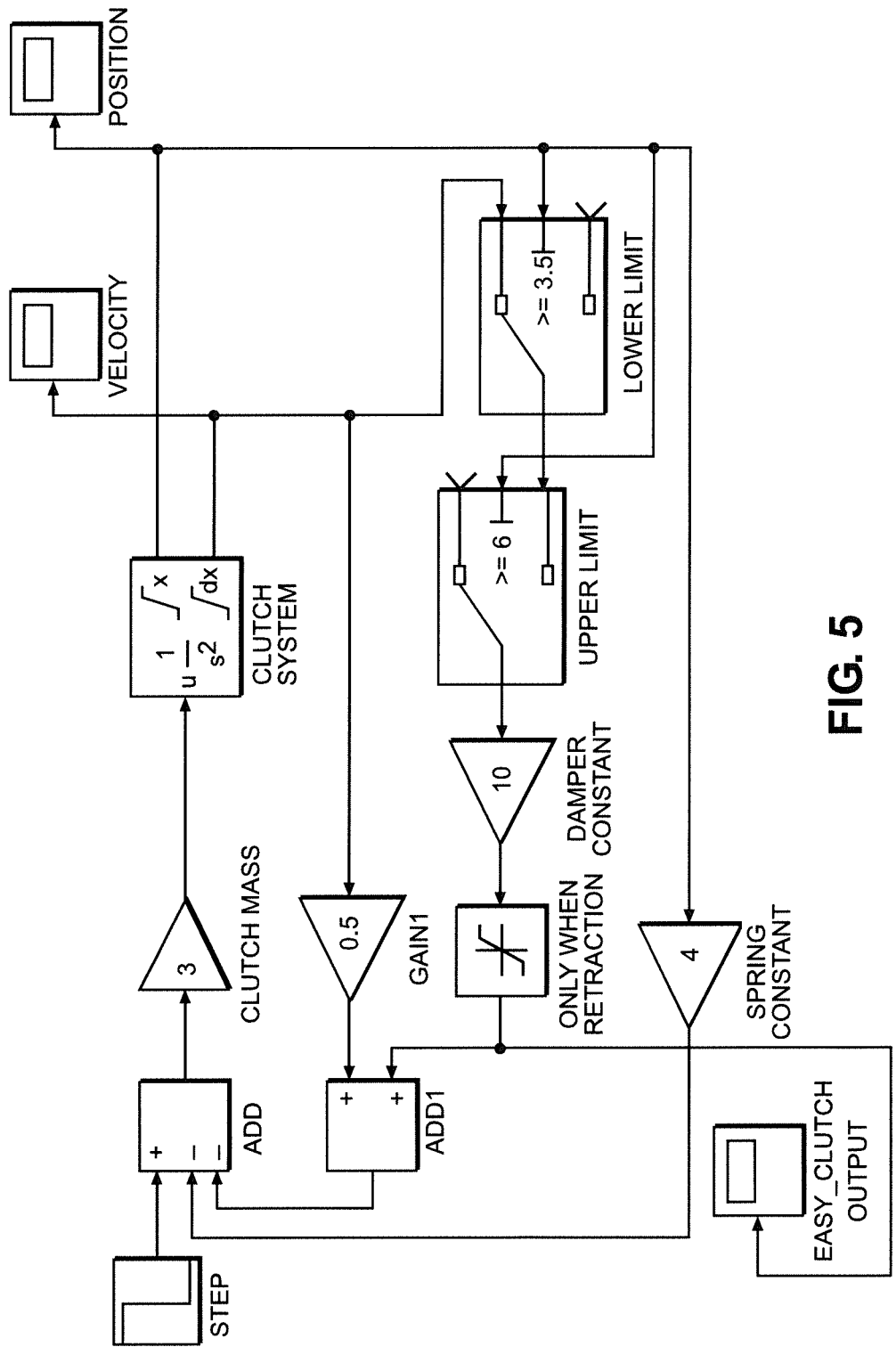
FIG. 5 illustrates a simulation of several engagement parameters of clutch.

FIG. 5 illustrates a mathematical simulation which has been used to simulate a typical operation of disengagement and subsequent engagement of a clutch and to generate the position and velocity parameters of FIGS. 3 and 4. Such a simulation could be helpful also in designing a real clutch damper.

Figure 6:
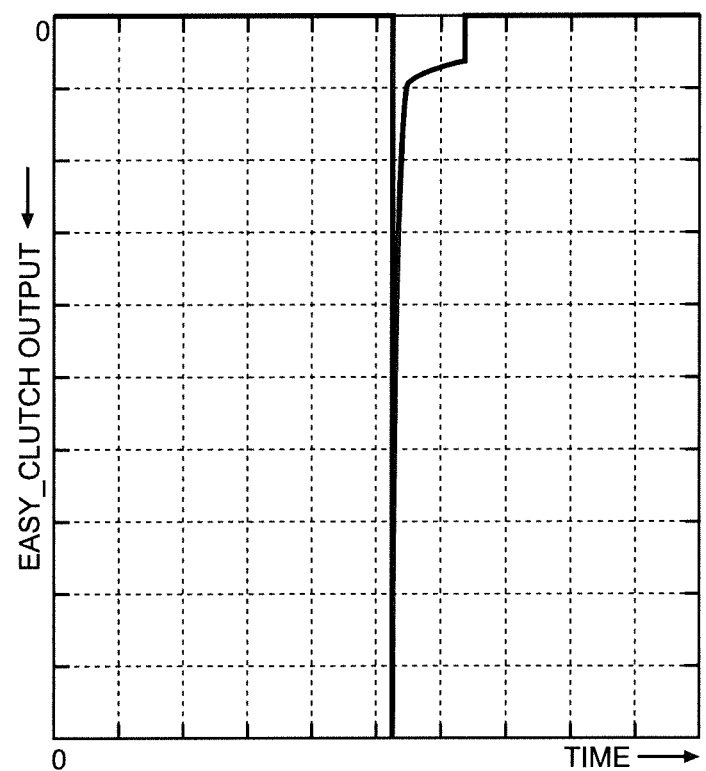
FIG. 6 is a graph showing an output signal of the simulation of FIG. 5.

FIG. 6 is a graph showing the signal 'Easy_Clutch output' of the simulation of FIG. 5. The non-zero part of this signal represents the energy loss within the damper during the dampening phase 30 of FIG. 3.

Based on the above, it should be readily apparent that the present invention provides a more comfortable clutch actuator with a damper. Although described with reference to preferred embodiments, it should be readily understood that various changes or modifications could be made to the invention without departing from the spirit thereof. In general, the invention is only intended to be limited by the scope of the following claims.

The invention claimed is:

1. A clutch actuator for a manual-shift motor vehicle transmission including a clutch, comprising:
    a driver-operated clutch pedal or lever,
    a clutch linkage between the clutch of the motor vehicle and the pedal or lever, and
    a damper adapted to delay clutch engagement on a fast release of the clutch pedal or lever, wherein the damper is an electromagnetic or a hydraulic damper and is configured to delay clutch engagement only within a limited range of a whole clutch engagement movement and is configured to be totally ineffective outside the limited range and within a whole range of a clutch disengagement movement.

2. The actuator according to claim 1, wherein the damper includes an actuating surface which engages an abutment surface of the clutch pedal or lever or of the clutch linkage while the clutch is engaged partially or completely, and which actuating surface is separated from the abutment surface by a clearance while the clutch is disengaged.

3. The actuator according to claim 2, wherein the damper is the hydraulic damper.

4. The actuator according to claim 1 wherein the damper is an electromagnetic damper including a permanent magnet and a coil.

5. The actuator according to claim 4 wherein the coil and magnet are adapted to produce a Lorentz force which is proportional to a relative velocity between the coil and the magnet.

6. The actuator according to claim 1 wherein the clutch actuator includes a motor and a mechanism for positioning of the damper in order to vary the limited range of delay.

7. The actuator according to claim 1 wherein the damper is of a linear type.

8. A clutch actuator for a manual-shift motor vehicle transmission including a clutch, comprising:
    a driver-operated clutch pedal or lever,
    a clutch linkage between the clutch of the motor vehicle and the pedal or lever,
    an abutment surface of the clutch pedal or lever or of the clutch linkage, and
    a hydraulic damper adapted to delay clutch engagement on a fast release of the clutch pedal or lever, wherein the damper is effective to delay clutch engagement within a limited range of a whole clutch engagement movement, wherein the damper includes an actuating surface which engages the abutment surface while the clutch is engaged partially or completely, and which actuating surface is separated from the abutment surface by a clearance while the clutch is disengaged.

9. The actuator according to claim 8 wherein the damper is adapted to be substantially ineffective outside the limited range.

10. The actuator according to claim 8 wherein the damper is adapted to be substantially ineffective within the whole range of a clutch disengagement movement.

11. The actuator according to claim 8 wherein the clutch actuator includes a motor and a mechanism for positioning of the damper in order to vary the limited range of delay.

12. The actuator according to claim 8 wherein the damper is of a linear type.

13. A clutch actuator for a manual-shift motor vehicle transmission including a clutch, comprising:
    a driver-operated clutch pedal or lever,
    a clutch linkage between the clutch of the motor vehicle and the pedal or lever,
    an abutment surface of the clutch pedal or lever or of the clutch linkage, and
    an electromagnetic damper including a permanent magnet and a coil, said damper adapted to delay clutch engagement on a fast release of the clutch pedal or lever, wherein the damper is effective to delay clutch engagement within a limited range of a whole clutch engagement movement, wherein the damper includes an actuating surface which engages the abutment surface while the clutch is engaged partially or completely, and which actuating surface is separated from the abutment surface by a clearance while the clutch is disengaged.

14. The actuator according to claim 13 wherein the coil and magnet are adapted to produce a Lorentz force which is proportional to a relative velocity between the coil and the magnet.

15. A method of damping a clutch with a clutch actuator in a manual-shift motor vehicle transmission including the clutch, a driver-operated clutch pedal or lever, a clutch linkage between the clutch of the motor vehicle and the pedal or lever, and a hydraulic damper adapted to delay clutch engagement on a fast release of the clutch pedal or lever, wherein the damper is effective to delay clutch engagement only within a limited range of a whole clutch engagement movement and being substantially ineffective outside the limited range and within a whole range of a clutch disengagement movement, wherein the damper includes an actuating surface which engages an abutment surface of the clutch pedal or lever or of the clutch linkage while the clutch is engaged partially or completely, and which actuating surface is separated from the abutment surface by a clearance while the clutch is disengaged, said method comprising:
    delaying the clutch engagement on the fast release of the clutch pedal or lever with the damper, within the limited range of a whole clutch engagement movement.

16. The method according to claim 15 wherein the delaying does not occur outside the limited range.

17. The method according to claim 15 wherein the delaying does not occur within the whole range of a clutch disengagement movement.

18. The method according to claim 15 further comprising positioning the damper in order to vary the limited range of delay.

* * * * *